United States Patent [19]

Oriol

[11] 4,077,535

[45] Mar. 7, 1978

[54] ASSEMBLY FOR THE AUTOMATIC OPERATION OF HAND CARTS, ESPECIALLY HOSPITAL CARTS

[75] Inventor: André C. Oriol, Paris, France

[73] Assignee: Saxby, Paris, France

[21] Appl. No.: 688,584

[22] Filed: May 21, 1976

[30] Foreign Application Priority Data

May 29, 1975 France .............................. 75 16797

[51] Int. Cl.² ........................... B60D 1/04; B60P 1/10
[52] U.S. Cl. ................................ 214/515; 180/14 R; 180/98; 254/7 C
[58] Field of Search ................... 180/98, 14 R, 11, 12; 214/515; 280/434, 33.99 R; 254/7 C, 45; 108/144

[56] References Cited

U.S. PATENT DOCUMENTS

| 1,772,939 | 8/1930 | Fitch | 296/35 A |
|---|---|---|---|
| 2,761,522 | 9/1956 | Paradiso | 180/12 |
| 2,973,823 | 3/1961 | Stentz | 180/11 |
| 3,474,877 | 10/1969 | Wesener | 180/98 |
| 3,495,677 | 2/1970 | Wilson | 180/98 |
| 3,647,014 | 3/1972 | Wilke | 214/515 X |
| 3,648,869 | 3/1972 | Christianson | 280/33.99 R X |
| 3,702,641 | 11/1972 | Schnell | 180/14 R |
| 3,851,854 | 12/1974 | Roybal | 254/7 C |

Primary Examiner—Richard A. Bertsch
Assistant Examiner—R. Schrecengost
Attorney, Agent, or Firm—Oblon, Fisher, Spivak, McClelland & Maier

[57] ABSTRACT

An assembly for providing automatic operation of hand carts of the type particularly adapted for hospital usage, featuring an electric automotive device being controlled by buried cables and capable of sliding beneath the base of said hand cart, a vertically movable platform on said automotive device for lifting said hand cart when said device is disposed therebeneath, a plurality of realignment knobs on said lifting platform for cooperating with a corresponding plurality of cone-shaped cups on the lower side of said hand cart base, and spaced apart magnetic detectors on said automotive device cooperable with at least one magnet on the lower side of said hand cart base for controlling the slowing down and stopping of the device under said cart when it is positioned therebeneath by moving along said buried cables.

6 Claims, 15 Drawing Figures

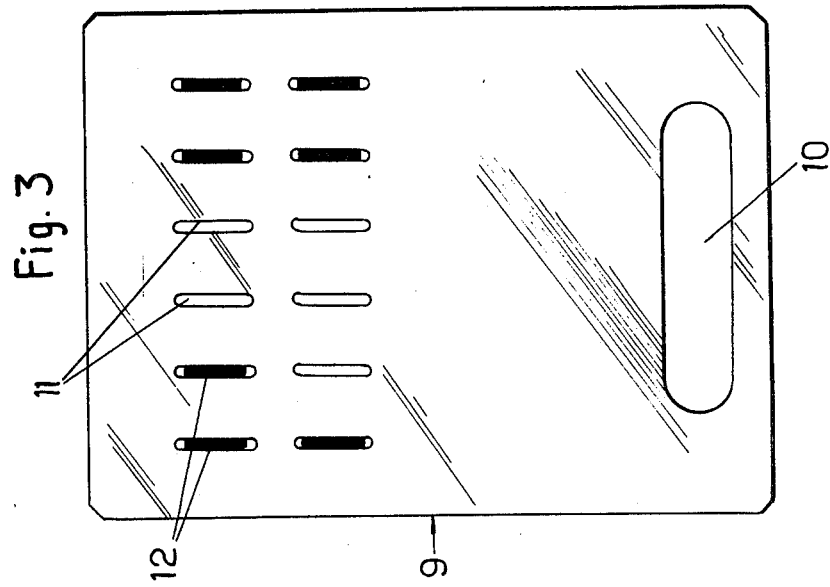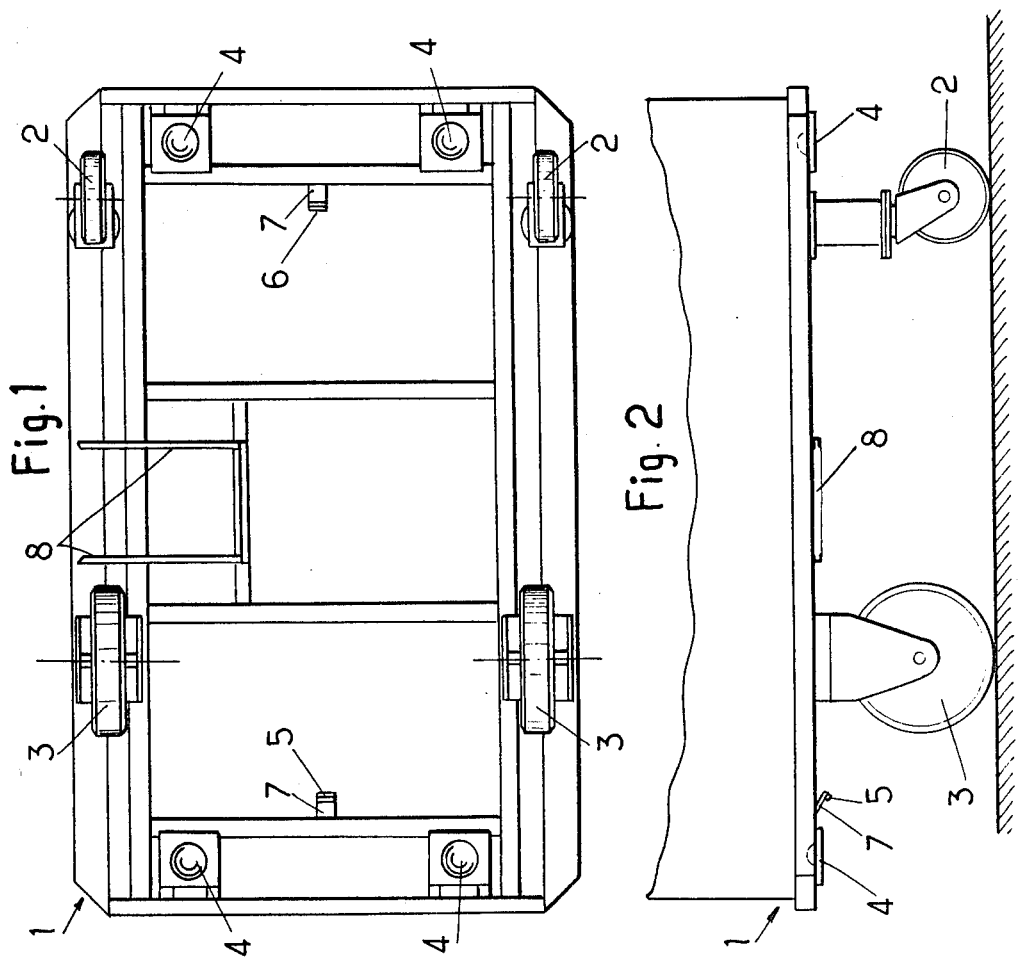

ASSEMBLY FOR THE AUTOMATIC OPERATION OF HAND CARTS, ESPECIALLY HOSPITAL CARTS

BACKGROUND OF THE INVENTION

1. Field of the Invention

The present invention concerns an assembly for the automatic operation of hand carts, especially hospital carts.

It is known that in certain institutions, particularly hospitals, the transport and distribution of various products must be organized, e.g., linen, meals, medicine, etc., generally over long distances and on different levels, from one or several central stations, such as the linen room, the kitchen, etc. Hand carts are used for this purpose and are currently most frequently operated over their entire route by hospital personnel, obviously a considerable burden to this personnel.

2. Description of the Prior Art

This is why a system was recently proposed which would allow hand carts to be operated automatically over at least part of their route. In this known system, small, remote-controller devices are used which can slide under the carts in order to draw them along a predetermined track, and also into dumb-waiters, if necessary, by means of one or several driving fingers in cooperation with a hooking unit provided on the base of each cart.

A system such as this, however, allows the cart to be driven in only one direction, which is a substantial drawback. One particular result of this is that the dumb-waiters must have two doors, so that the cart can enter through one door and exit through the other, always travelling in the same direction.

Moreover, since the carrying wheels of the cart remains in contact with the floor, these wheels must all be of the swivel type, so that the cart can turn appropriately in curves under the action of its driving device. It is known that such carts are quite difficult to operate manually. If the cart is to be pushed by hand, it is in fact preferable that the cart be equipped with only two swivel-wheels. It is obvious, moreover, that under certain circumstances the carts must in any case be moved by hand, if only to bring them into the patients' rooms.

SUMMARY OF THE INVENION

The main purpose of the present invention, therefore, is to overcome all these drawbacks and to do so, its object is an assembly of the aforementioned type, basically characterized by the fact that it includes at least one electrical automotive device with electronic control through buried wires, capable of sliding under the base of the cart and of raising it above the floor, by means of a lifting platform provided with four realignment knobs cooperating with conical cups on the base.

It can easily be conceived that this arrangement makes it possible for the cart to be driven, in combination with this device, in any direction whatsoever, and that double-door dumb-waiters are no longer necessary. In addition, since the cart is raised above the ground-level when driven automatically, two stationary wheels may be conveniently provided, considerably facilitating its manual operation.

It should also be noted that the realignment knobs of the platform, cooperating with the cups of the base, assure that the cart is always perfectly positioned on the device and can in no way be unexpectedly displaced. This positioning accuracy of the cart also easily ensures, as will be seen later, coded connection with the device for the purpose of controlling its destination.

The raising of the lifting platform is preferably assured by four screw and nut jacks, synchronized by means of an endless chain gearing, with four pinions keyed on the four nuts of such jacks, respectively.

In this way, particularly simple raising of the platform is achieved, always in a strictly horizontal plane, and thus of no risk to the products carried on the cart.

In one particular embodiment of the invention, each cart includes, on the underside of its base, at least one magnet cooperating with two longitudinally spaced magnetic detectors borne by the automotive device, and which control, respectively and successively, the slowing down of the device, then its halting under the cart. In this way, the prior showing of the device makes it possible to obtain a sufficiently accurate stopping of the device uner the base of the cart, small laps automatically corrected when the platform is raised by the realignment knobs lodging in the conical cups. The magnet is preferably placed on the extremity of a swivel-mounted support of the base, so that it normally protrudes downwards under the action of a recall spring. This arrangement allows the magnet to pass quite close to the associated detectors on the device, thus eliminating any change of error, and to be retracted when the platform is raised.

The assembly also preferably includes a certain number of starting guides arranged on the floor in appropriate locations and between which the carts are positioned manually before the automotive device takes over.

It is, indeed, obvious that the device cannot seek out a cart just anywhere, since it is remote-controlled by a buried wire.

Each cart base is advantageously provided with a receptacle for containing a removable, coded magnetic card bearing the intended destination of the cart in question, the card cooperating with a code reader placed directly on the automotive device. It can be seen therefore that this relatively simple address system is made possible by the fact that the cart is always accurately positioned on its driving device.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein:

FIG. 1 is a view of the underside of the base of one of the hand carts used in the operating assembly according to the present invention;

FIG. 2 is an elevational side view of the cart, as shown in FIG. 1;

FIG. 3 is a top view on a large scale of a coded magnetic card which the cart shown in FIGS. 1 and 2 will carry with it;

DETAILED DESCRIPTION OF A PREFERRED EMBODIMENT

Figure 4:
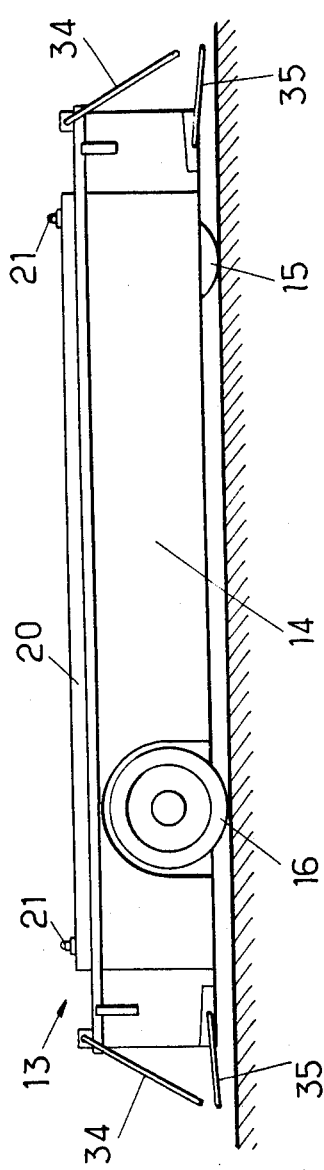
FIG. 4 is a schematic side view of the automotive device, also part of the operating assembly according to the invention.

The assembly of this invention is more especially designed for the automatic operation of hand carts of the type which are used in hospitals. For this purpose, each of the carts has a base common to all, in the form of a flat frame similar to that which is represented by the reference numeral 1 in FIGS. 1 and 2, on which different types of bodies can be fitted and which are adapted to each particular utilization. The base 1 normally rests on the floor on four wheels, and it will be noted immediately that only two of these are swivel-type, as illustrated by the reference numeral 2, while the two other wheels 3 are fixed. It is thus possible to push the cart easily by hand when necessary.

The base 1 is advantageously constructed of electrically welded sections, for good mechanical rigidity, and has four cone-shaped cups 4 on its underside, arranged in a rectangle, the function of which will be made more clear below. Also provided on this underside are two magnets 5 and 6, placed near the two extremities of the base on its center axis, the role of which will also be made more clear later in this description. In fact, each of these magnets is held in place by a support 7, swivel-mounted on the base and normally protruding downwards, as illustrated in FIG. 2, under the action of a recall spring, not shown.

The base 1 of the cart finally has a grooved receptacle 8, located on its side, into which a coded magnetic card 9, such as that shown in FIG. 3, can be slid. This card has a recess 10, forming a handle, as well as a certain number of slots 11, into which magnets 12 can be placed at will, according to a pre-determined code which represents the intended destination of the cart in question.

Figure 5:
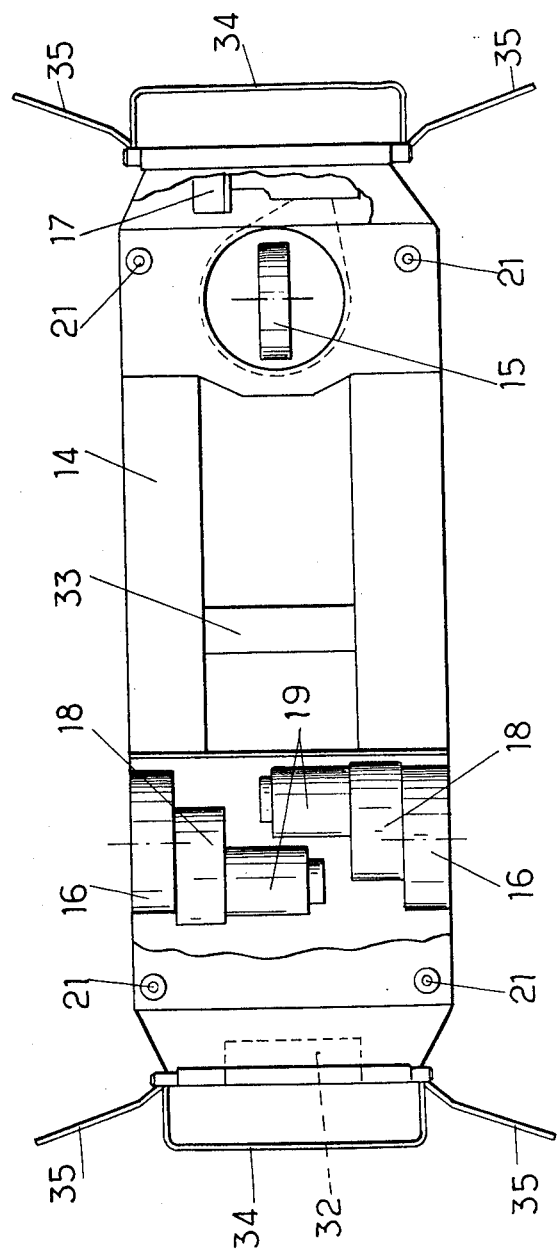
FIG. 5 is a top view of the device shown in FIG. 4 with parts of this device exposed.
Figure 6:
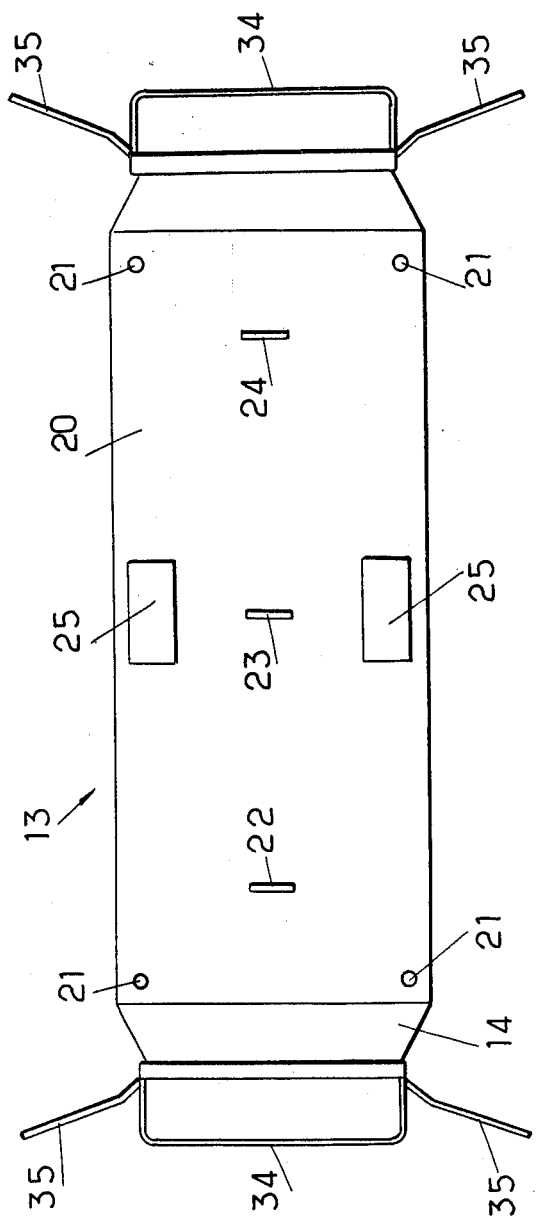
FIG. 6 is another top view of the automotive device, showing the location of certain of its elements.

According to the invention, the automatic operation of these carts is carried out by means of one or several electric automotive devices 13 of the type shown in FIGS. 4-6. This device consists basically of a relatively narrow, elongated chassis 14, in the form of a parallelepiped, as the height of which is such that it can be easily slid under the base 1 of the cart, between its two pairs of wheels, whatever the position of the swivel-wheels 2, which are smaller in diameter. It moves along the floor by means of three carrying wheels, and does so autonomously by means of batteries.

A front wheel 15 is intended for steering, while two rear wheels 16 assure both the propulsion and braking of the device. To this end, wheel 15 is swivel-mounted on chassis 14 and is coupled to a slaving motor 17. The rear wheels 16 are each coupled to a reducer unit 18 and to an electromagnetic brake 19. The two motors are connected in series to the battery, which allows different rotational speeds of the wheels for a given linear speed in curves.

The upper part of device 13 is formed basically by a lifting platform 20, vertically and movably mounted on chassis 14, which is provided with four alignment knobs 21 for cooperating with the four cone-shaped cups 4 of the base 1 of the cart. For this purpose, the extremities of these knobs 21 are advantageously ball-shaped in order to prevent friction.

The lifting platform 20 also has, as shown in FIG. 6, three magnetic detectors 22, 23 and 24 longitudinally spaced along the center axis, which cooperate with the magnets 5 and 6 on the base 1 of the cart, for assuring proper stopping of the device under the cart. A code reader 25 is also provided on each of the longtudinal sides of the platform to decode the destination inscribed on the magnetic card 9 situated in the receptacle 8 of the cart, and does so no matter from what direction in the device is placed under the cart. It is obvious, in fact, that the cart may run either forward or in reverse.

Figure 7:
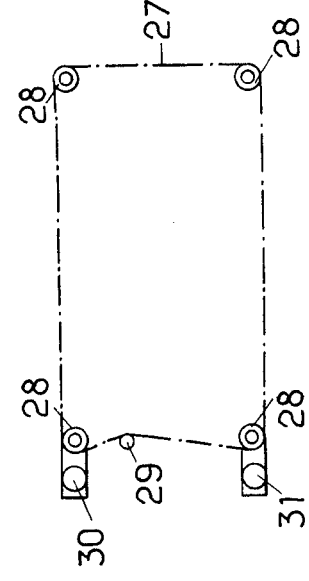
FIGS. 7 and 8 are highly schematic views, illustrating the lifting system of the platform borne by the device.
Figure 8:
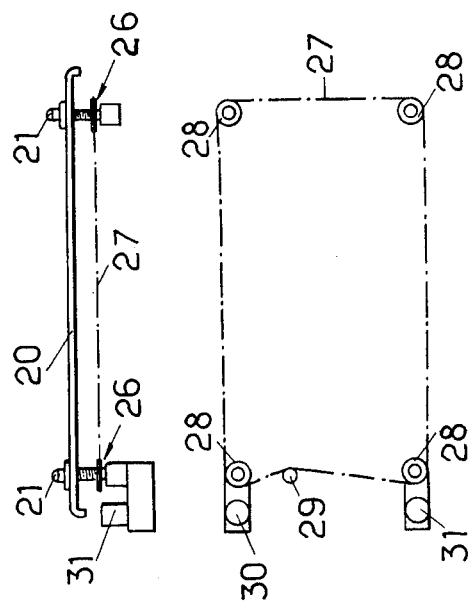

As FIGS. 7 and 8 illustrate, the raising of platform 20 is assured by four jacks 26 located as extensions of the realignment knobs 21. These jacks, of the rotary screw and nut type, are synchronized by means of an endless chain 27, gearing simultaneously with four pinions 28 keyed on the four jack nuts, respectively, and which is kept taut by a tension-roller 29. Two reducer units 30 and 31 grip two of these nuts directly and respectively, thus allowing, depending on their direction of rotation, platform 20 to be raised or lowered, vis-a-vis chassis 14.

The device which has just been described is remote-controlled, in a known manner, from a central control console, using a network of buried conductors, which thus create a certain number of pre-determined routes which the different carts are to follow. It is provided for this purpose with two sensors 32 and 33, seen in FIG. 5, for the forward and reverse operation of the device, respectively. These captor sensors are located along the longitudinal axis of the device, on either side of the rear axle, and assure reception of the magnetic field created around the wire which establishes the route by a current having a tonal frequency passing through the wire.

This particular arrangement of the sensors makes it possible to obtain floor clearances in curves which are identical in forward and reverse operation. In addition, since the distance separating the sensors from the rear axle is short, the device can obviously negotiate extremely sharp turns without veering from its path.

This device additionally has a certain number of safety elements, of known type, arranged at both ends and including hinged bows 34, as well as lateral elements 35 commonly called "whiskers". These various elements automatically cause the immediate halt of the device when they encounter an obstacle during operation.

Figure 9:
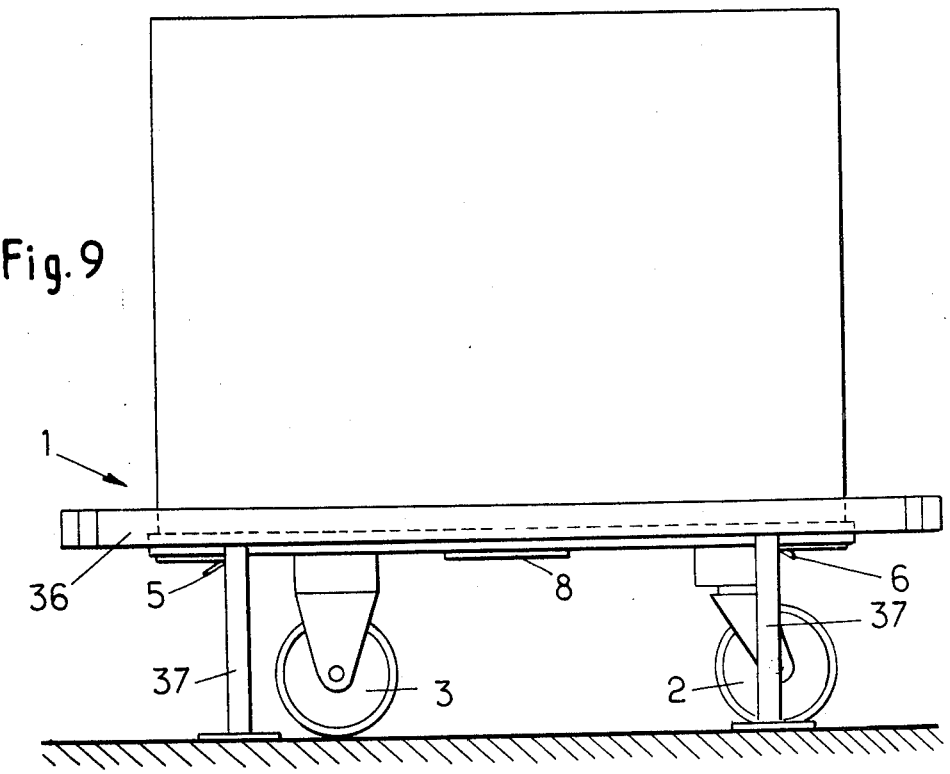
FIGS. 9 and 10 are elevational side and top views, showing the cart positioned between its starting guides.
Figure 10:
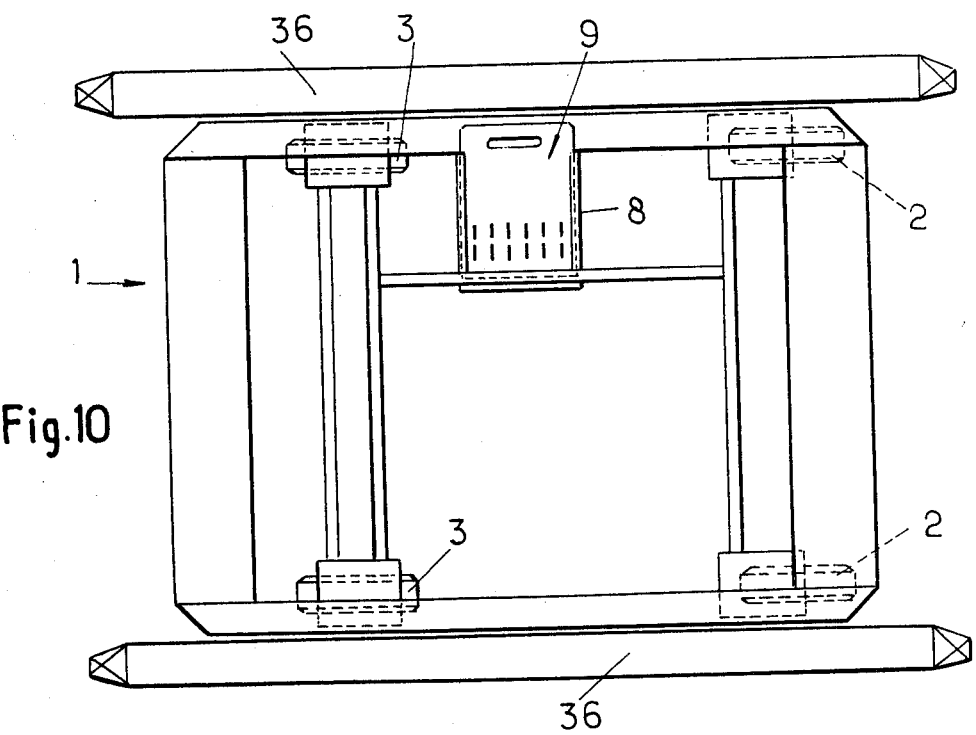

The automatic operating device according to the invention also includes a certain number of guides 36, shown in FIGS. 9 and 10, between which the carts must be placed manually before being propelled by device 13. These guides, called starting guides, are affixed to the floor by means of legs 37, so as to cooperate with the flat frame of the base of the cart, and are to be placed at the different start-up stations of the carts. The carts must be perfectly positioned at the start above the guide-wire of the device so that the device can propel the cart.

A brief description will now be given of the operation of an assembly such as described, with particular reference to FIGS. 11 to 15, which accurately illustrate the hook-up of the device to a cart.

Figure 11:
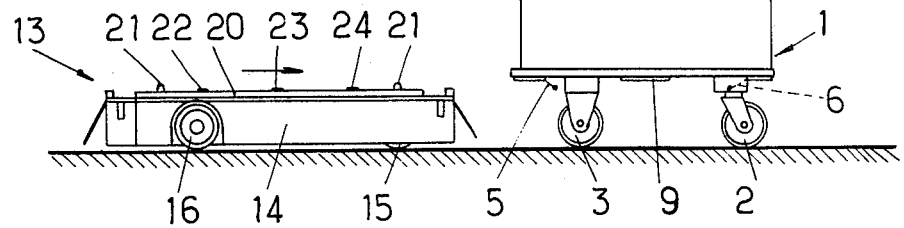
FIGS. 11 to 15 are elevational views illustrating how the automotive device links up with the cart.

A cart 1, as shown in FIG. 11, is presumed to have been placed manually between two starting guides 36, as illustrated in FIGS. 9 and 10. It should be noted that in FIGS. 11-15, these guides 36 have been omitted for the sake of clarity. The cart is also provided, in its receptacle 8, with a coded card 9 bearing the intended destination of the cart.

The presence of a cart in starting guides 36 automatically triggers the system by well-known means, not shown, but which may, for example, be micro-switches. An available device 13, is then immediately shunted toward said guides, thanks to the orders received from a central control console through the appropriate sensor 32 or 33, depending on the direction of operation.

Figure 12:
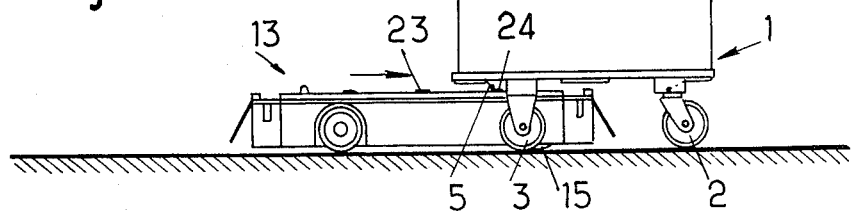

Since the device's lifting platform 20 is, at this point, in the low position, it can be easily slid under the cart base 1, which is perfectly aligned on the corresponding guide wire by means of the aforementioned guides. Then, in the particular example described here, the magnetic detector 24 on the device passes directly under magnet 5, protruding under cart base 1, as illustrated in FIG. 12, thus causing the device 13 to slow down sufficiently to allow it to stop in place.

Figure 13:
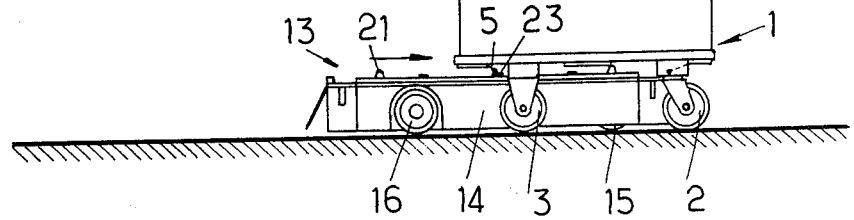
Figure 14:
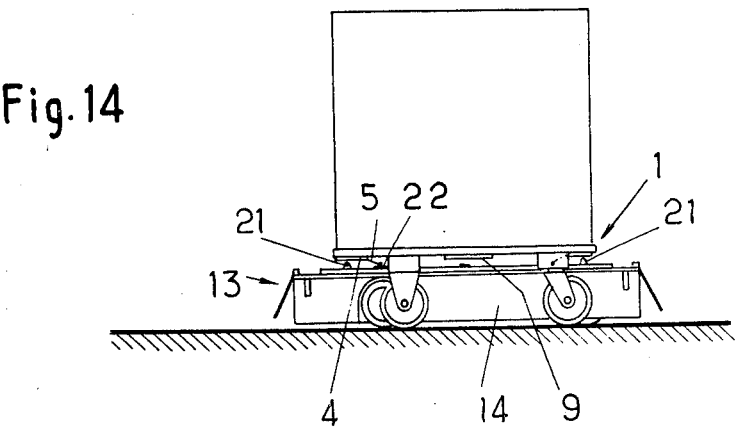

Magnet 5 then passes over detector 23, as shown in FIG. 13, and the device advances slowly under the cart until magnetic detector 22 passes under the same magnet 5, causing the device to stop in the position shown in FIG. 14. Lifting jacks 26 are thereupon activated by the appropriate reducing unit 30 or 31. causing platform 20 to rise.

Naturally, the functions of detectors 22 and 24 are reversed according to the travelling direction of the device. Similarly, magnets 5 and 6 play like roles, depending on what side of the cart the device is engaged. It will also be ntoed that each time a magnet passes over one of the detectors 22-24 it is kept in a memory to prevent possible errors. This memory is then reset to zero when the device is withdrawn from the cart which it has transported, by means of detector 23, solicited by either magnet 5 or magnet 6.

Figure 15:
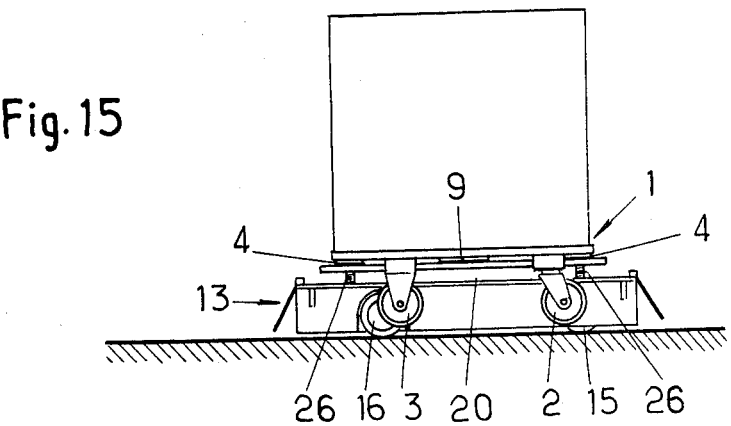

When platform 20 is raised, magnets 5 and 6 retract, whereupon the balls on the ends of realignment knobs 21 make contact with conical cups 4 on the cart base 1, automatically correcting minor misalignments. The cart is in this way always in perfect position on the device, and is at the same time raised slightly above floor-level, as shown in FIG. 15. From this moment on, the cart 1 and the device 13 form an assembly, the route of which is determined solely by the kinematics of the device, since the wheels of the cart are no longer in contact with the floor.

It will also be noted that the chain-synchronization of jacks 26 allows platform 20 to remain perfectly horizontal at all times, so that the cart is also raised horizontally, thus avoiding any risks to the products it is carrying.

The accurate positioning of the cart, vis-a-vis the device 13, and the fact that the device has two identical code readers 25, allow the coded card 9 on the cart to be placed correctly at all times opposite one of these readers. The address on this cart can therefore be decoded and is then transmitted to the central control console by a transmitter placed on the device.

Code reader 25 can, for example, consist of small, flexible plate switches sensitive to the magnets 12 on card 9. When the card is placed opposite the reader, the corresponding magnets activate the opposite switches, which, after decoding, correspond to a pre-determined frequency transmitted by the guide wire to the central console. The console then sends the orders which the device needs in order for it to travel automatically to the destination corresponding to the proper address, if necessary using a dumb-waiter, which is, in this case, controlled directly by the device.

A special magnet may, of course, be provided on all of cards 9, making it possible to know the direction in which the card is placed in its receptacle 8, thus avoiding the need to read the card upside down and the use of a mechanical corrector.

When it arrives at its destination, device 13 lowers the cart onto the floor by lowering its platform 20, and then leaves immediately for another assignment or a stand-by station. The cart is then operated manually and can be easily pushed to its final destination, e.g., a patient's room, because it, like ordinary hand carts, has only two swivel wheels.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An assembly for providing automatic operation of hand carts including hospital carts, comprising:
    at least one electric powered and electronically controlled automotive device capable of sliding under the base of said hand cart;
    platform means on said device for raising said hand cart above the floor;
    means for aligning said hand cart on said platform means;
    at least one magnet on the underside of said base; and
    two longitudinally spaced magnetic detectors on said automotive device for slowing said automotive device in response to activation by said at least one magnet of a first one of said detectors as said device slides under said cart and for stopping said automotive device in response to activation by said at least one magnet of a second one of said detectors.

2. An assembly according to claim 1, wherein said platform means comprises a plurality of screw of nut jacks, synchronized by an endless chain gearing with a plurality of pinions keyed on said nuts of said jacks, respectively.

3. An assembly according to claim 1, further comprising: a plurality of starting guides, arranged on the floor at appropriate locations and between which the carts are positioned manually before being engaged by said automotive device.

4. An assembly according to claim 1, wherein: said cart base is provided with a receptacle for containing a removable magnetic coded card bearing the intended destination of the cart in question and cooperating with a code reader placed directly on the automotive device.

5. An assembly according to claim 1, further comprising a swiveling support mounting said magnet on said base.

6. An assembly according to claim 1, wherein said aligning means comprises a plurality of alignment knobs on said platform means and a plurality of cone-shaped cups on the underside of said base for interengaging said knobs.

* * * * *